US012024998B2

(12) United States Patent
Converset et al.

(10) Patent No.: US 12,024,998 B2
(45) Date of Patent: Jul. 2, 2024

(54) DETECTION OF FLUID EVENTS IN A WELLBORE

(71) Applicant: Schlumberger Technology Corporation, Sugar Land, TX (US)

(72) Inventors: Julien Converset, Clamart (FR); Aditya Garga, Clamart (FR)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

(21) Appl. No.: 18/064,387

(22) Filed: Dec. 12, 2022

(65) Prior Publication Data

US 2023/0243254 A1 Aug. 3, 2023

Related U.S. Application Data

(60) Provisional application No. 63/265,235, filed on Dec. 10, 2021.

(51) Int. Cl.
*E21B 47/047* (2012.01)
*G08B 21/18* (2006.01)

(52) U.S. Cl.
CPC .......... *E21B 47/047* (2020.05); *G08B 21/182* (2013.01)

(58) Field of Classification Search
CPC .................................................... E21B 47/047
See application file for complete search history.

(56) References Cited

U.S. PATENT DOCUMENTS

| | | | |
|---|---|---|---|
| 6,820,702 | B2 | 11/2004 | Niedermayr et al. |
| 10,385,674 | B2 | 8/2019 | Ahmed |
| 11,542,760 | B2 | 1/2023 | Chambon et al. |
| 2016/0245027 | A1 | 8/2016 | Gumus et al. |
| 2018/0266233 | A1 | 9/2018 | Ahmed |
| 2019/0353012 | A1 | 11/2019 | Al Gharbi et al. |
| 2020/0318464 | A1 | 10/2020 | Atchison et al. |

FOREIGN PATENT DOCUMENTS

| | | | |
|---|---|---|---|
| WO | 2017221046 | A1 | 12/2017 |
| WO | 2019173841 | A1 | 9/2019 |

OTHER PUBLICATIONS

Search Report and Written Opinion of International Patent Application No. PCT/US2022/052541 dated Apr. 25, 2023, 10 pages.

*Primary Examiner* — Kristyn A Hall
(74) *Attorney, Agent, or Firm* — Jeffrey D. Frantz

(57) ABSTRACT

A method includes obtaining fluid volume change data for a fluid circuit including a wellbore and one or more tripping tanks, the fluid volume change data representing the fluid circuit during a tripping operation for each of a plurality of pipe stands and forming a buffer, calculating a delta displacement threshold based at least in part on the buffer, receiving additional fluid volume change data for the fluid circuit, the additional fluid volume change data representing the fluid circuit during a tripping operation for a first stand, comparing the fluid volume change data for the first stand with the delta displacement threshold, determining that the fluid volume change data for the first stand represents a delta displacement that is greater in magnitude than the delta displacement threshold, and initiating an alarm in response to the delta displacement being greater than the delta displacement threshold.

20 Claims, 6 Drawing Sheets

DETECTION OF FLUID EVENTS IN A WELLBORE

CROSS-REFERENCE TO RELATED APPLICATIONS

This application claims priority to U.S. Provisional patent application having Ser. No. 63/265,235, which was filed on Dec. 10, 2021, and is incorporated herein by reference in its entirety.

BACKGROUND

Drilling systems generally include a fluid circuit that is made up of trip tanks, pumps, and the wellbore itself, among other devices. The trip tanks and the pumps, for example, may be operated to circulate fluid into the wellbore, so as to keep the wellbore continuously filled and maintain a desired pressure in the well, for example, or for various other purposes. During well construction, the level of fluid in the wellbore may be monitored to detect failures in the primary well barrier. Such failures can result either in an influx of formation fluid (e.g., a "kick") or rapid fluid loss into the formation.

During tripping operations in particular, the risk of swabbing or surging the formation may lead to a catastrophic event, if not detected early. Tripping operations are conducted by deploying or removing tubulars (e.g., "stands" of two or more joints of pipe that are connected together, end-to-end) into or out of the well. As such, the volume occupied by the pipe itself in the fluid system changes as the pipe is tripped in/out of the wellbore. Thus, the volume of the fluid in the fluid circuit is not static. Accordingly, the fluid circuit is designed to compensate for the pipe occupying a range of potential volumes in the wellbore, while keeping the wellbore filled with fluid.

Monitoring the trip tank level and comparing to the volume occupied by the pipe in the wellbore can be used to detect anomalies related to fluid losses or influx from the formation. This is generally a manual process, however, whereby rig personnel at the rig site log fluid volume in the trip tanks along with a theoretical volume of pipe added/removed during current operations. However, this introduces the possibility of operator error, e.g., mistakes in recording many measurements. Further, the inference of an unexpected loss/gain in fluid may be subjective, e.g., as determined by the operator, and thus false alarms can be raised and/or the early stages of fluid loss/gain might be undetected.

SUMMARY

Embodiments of the disclosure include a method including obtaining fluid volume change data for a fluid circuit including a wellbore and one or more tripping tanks, the fluid volume change data representing the fluid circuit during a tripping operation for each of a plurality of pipe stands, and the fluid volume change data for the plurality of pipe stands forming a buffer, calculating a delta displacement threshold based at least in part on the buffer, receiving additional fluid volume change data for the fluid circuit, the additional fluid volume change data representing the fluid circuit during a tripping operation for a first stand, comparing the fluid volume change data for the first stand with the delta displacement threshold, determining that the fluid volume change data for the first stand represents a delta displacement that is greater in magnitude than the delta displacement threshold, and initiating an alarm in response to determining that the fluid volume change data for the first stand represents the delta displacement that is greater in magnitude than the delta displacement threshold.

Embodiments of the disclosure include a computing system including one or more processors, and a memory system comprising one or more non-transitory computer-readable media storing instructions that, when executed by at least one of the one or more processors, cause the computing system to perform operations, the operations including obtaining fluid volume change data for a fluid circuit including a wellbore and one or more tripping tanks, the fluid volume change data representing the fluid circuit during a tripping operation for each of a plurality of pipe stands, and the fluid volume change data for the plurality of pipe stands forming a buffer, calculating a delta displacement threshold based at least in part on the buffer, receiving additional fluid volume change data for the fluid circuit, the additional fluid volume change data representing the fluid circuit during a tripping operation for a first stand, comparing the fluid volume change data for the first stand with the delta displacement threshold, determining that the fluid volume change data for the first stand represents a delta displacement that is greater in magnitude than the delta displacement threshold, and initiating an alarm in response to determining that the fluid volume change data for the first stand represents the delta displacement that is greater in magnitude than the delta displacement threshold.

Embodiments of the disclosure include a non-transitory computer-readable medium storing instructions that, when executed by one or more processors of a computing system, cause the computing system to perform operations, the operations including obtaining fluid volume change data for a fluid circuit including a wellbore and one or more tripping tanks, the fluid volume change data representing the fluid circuit during a tripping operation for each of a plurality of pipe stands, and the fluid volume change data for the plurality of pipe stands forming a buffer, calculating a delta displacement threshold based at least in part on the buffer, receiving additional fluid volume change data for the fluid circuit, the additional fluid volume change data representing the fluid circuit during a tripping operation for a first stand, comparing the fluid volume change data for the first stand with the delta displacement threshold, determining that the fluid volume change data for the first stand represents a delta displacement that is greater in magnitude than the delta displacement threshold, and initiating an alarm in response to determining that the fluid volume change data for the first stand represents the delta displacement that is greater in magnitude than the delta displacement threshold.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
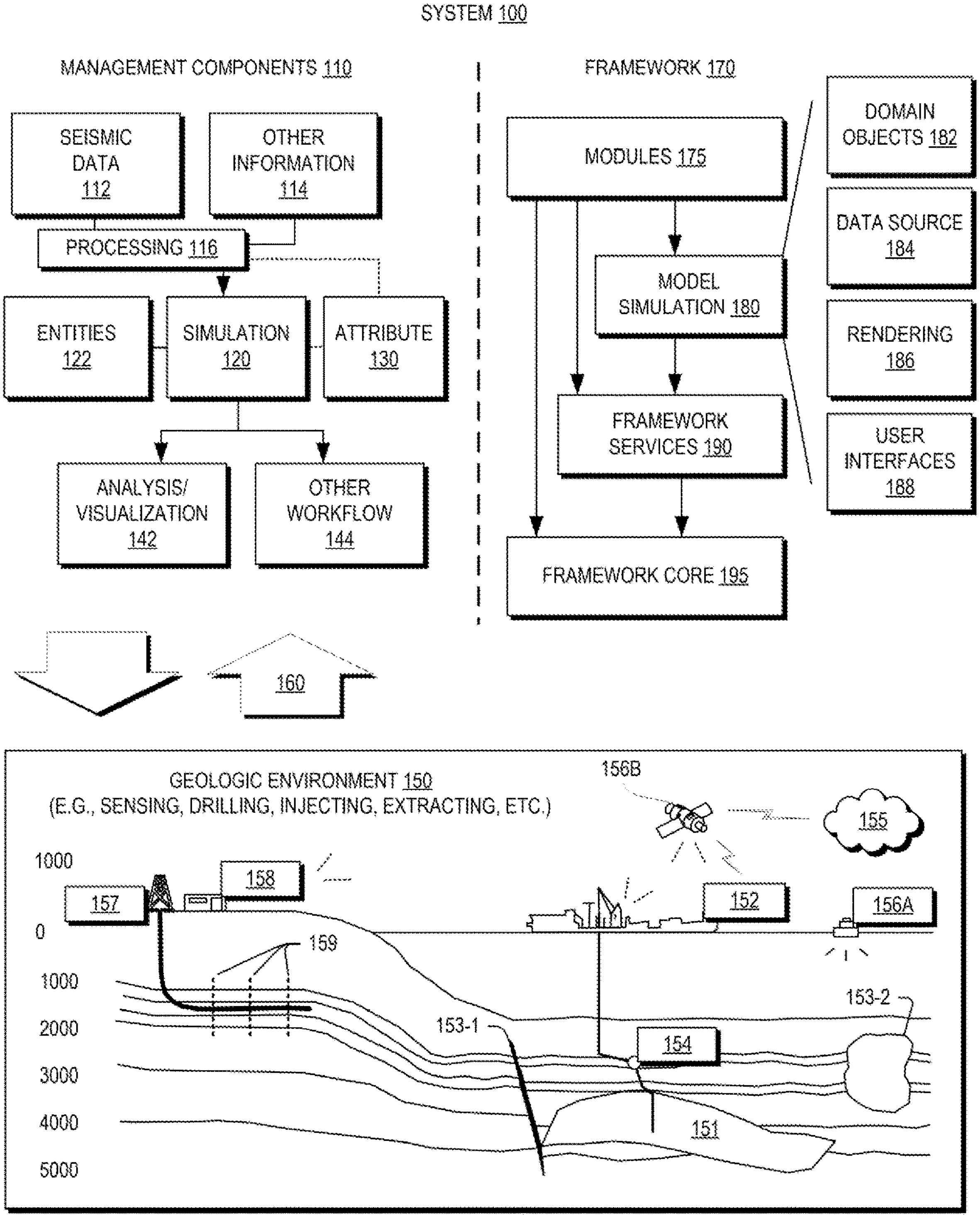
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142, and a workflow component 144. In operation, seismic data and other information provided per the seismic data component 112 and the additional information component 114, respectively, may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data from seismic data component 112 and other information from additional information component 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Washington), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Texas), the INTERSECT™ reservoir simulator (Schlumberger Limited, Houston Texas), etc. As an example, the simulation component 120, a simulator, etc., may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156A, 156B may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and equipment 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc., may exist where an assessment of such variations may assist with planning, operations, etc., to develop a laterally extensive reservoir (e.g., via fracturing, injecting, extracting, etc.). As an example, the equipment 157 and/or the equipment 158 may include components, a system, systems, etc., for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Embodiments of the present disclosure may automate the creation and update of the trip sheet and notify user of anomaly in mud volume displacement during tripping operation. In the case of rig equipped with multiple trip tanks, the embodiments may include determining which trip tank is connected to the wellbore. Embodiments may also include detecting whether the trip tanks are filled up or emptying from/to external pits. Embodiments may be applied to any tripping operation where the trip tank is connected to the wellbore and the wellbore filled up continuously with a trip tank pump.

Moreover, embodiments may provide an automatic solution to generate a "trip sheet" and detect anomalies in real time based on mud volume displacement during tripping operations. At least some embodiments may include automatic detection of active trip tanks (e.g., those tanks that are "lined up"); automatic detection of trip tank filling up/emptying based on drilling pipe and trip tank pump specifications; automatic computation of mud volume change per stand run in hole or pull out of hole; and automatic detection of abnormal volume displaced based on trending method, which may avoid creating a detailed pipe tally document. Although the term "pipe stand" may be used to refer to a pre-connected assembly of two or more integral pipe segments, for purposes of the present disclosure, a "pipe stand" (or "stand") can refer to a single pipe or an assembly of two or more pipes that are connected to a string as a single unit and deployed as part of the string into a wellbore.

Figure 2:
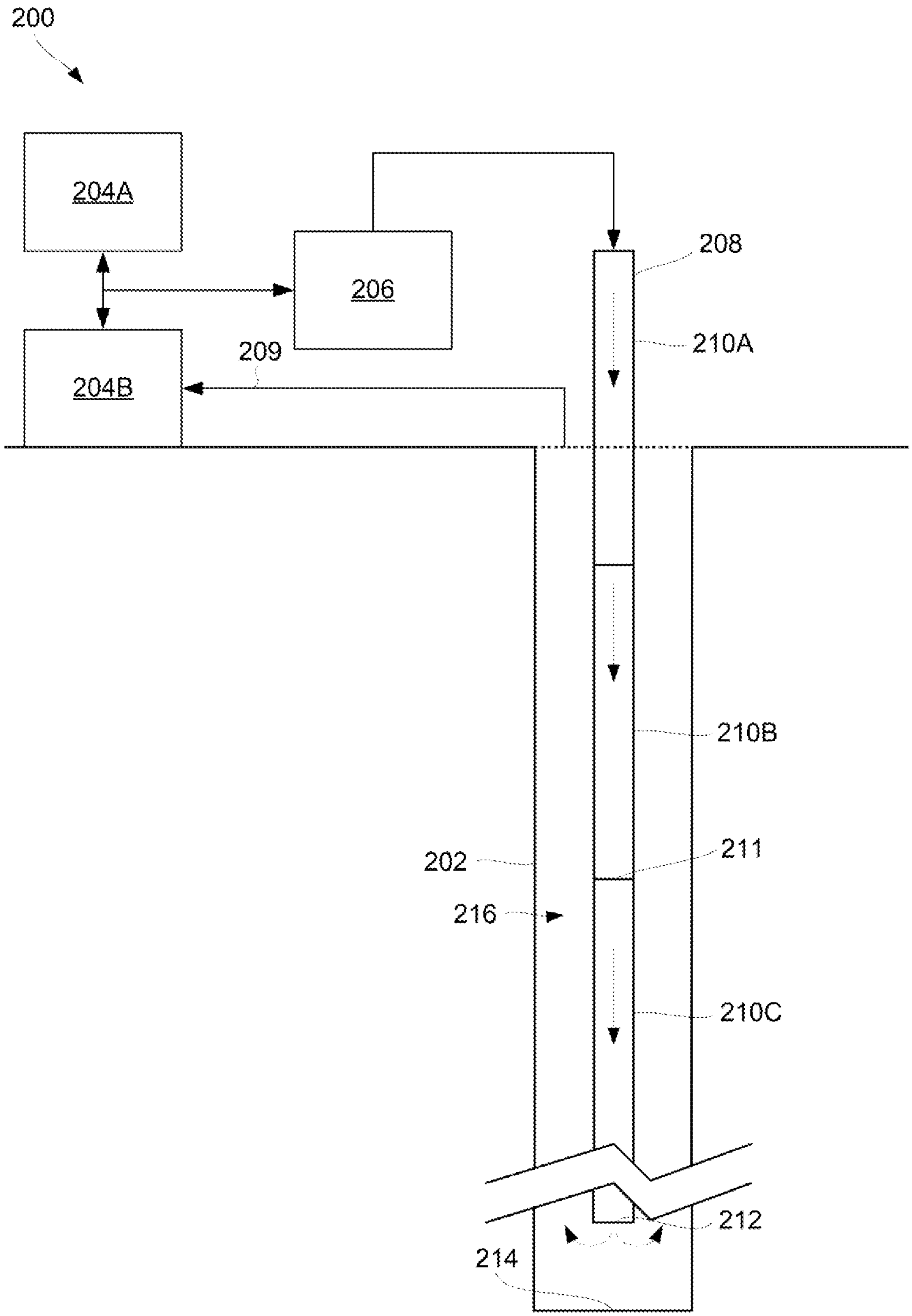
FIG. 2 illustrates a simplified, schematic view of a fluid circuit for a well, according to an embodiment.

FIG. 2 illustrates a simplified, schematic view of a fluid circuit 200 for a well 202, according to an embodiment. The fluid circuit 200 may also include various rig elements, sensors, etc., which are not visible in this view, but will be apparent to one of ordinary skill in the art. The fluid circuit 200, as illustrated in this simplified depiction, includes two fluid tripping tanks 204A, 204B, which are each configured to contain drilling fluid. The fluid level in the tripping tanks 204A, 204B may be monitored by sensors. Further, the tripping tanks 204A, 204B may be fluidly connected together, or may be operated independently of one another. The tripping tanks 204A, 204B may be coupled to a pump 206, which may be configured to deliver fluid to a pipe string 208 that is being tripped into or out of the well 202. The pipe string 208 may include stands 210A, 210B, 210C of one or more pipes, which are connected together at connections 211 formed therebetween. A wellbore outlet 209 may be coupled to the tripping tanks 204A, 204B and configured to deliver fluid from within the well 202 to the tripping tanks 204A, 204B.

During the tripping operations, the pipe string 208 may be progressively deployed into or removed from within the well 202, with additional pipe stands added, or the top-most pipe stand being removed, so as to successively increase or decrease the length of the pipe string 208, generally while drilling activities are not being conducted. More particularly, a distal end 212 of the pipe string 208 may be advanced toward or withdrawn from a bottom 214 of the well 202. During such time, fluid may be delivered into an annulus 216 between the well 202 and the pipe string 208 through the pipe string 208, as shown. It will be appreciated that the well 202 may be deviated, horizontal, or have any suitable trajectory, with the illustrated vertical well merely being a simple example.

Figure 3:
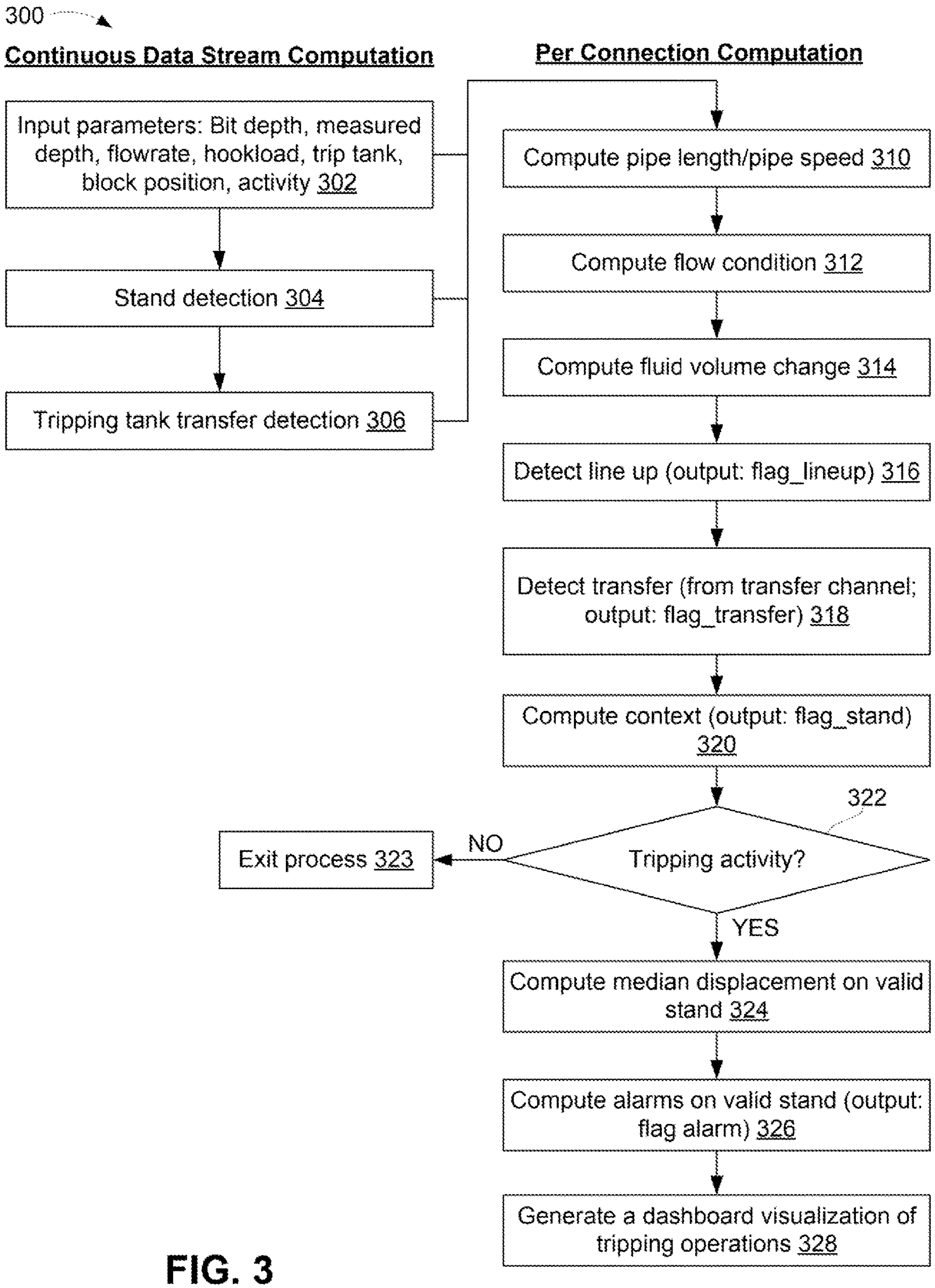
FIG. 3 illustrates a flowchart of a method for detecting and mitigating a fluid event in a wellbore during a tripping operation, according to an embodiment.

FIG. 3 illustrates a flowchart of a method 300 for detecting and mitigating a fluid event in a wellbore during a tripping operation, according to an embodiment. The method 300 may be executed using one or more embodiments of the fluid circuit 200. The method 300 may include receiving input parameters, as at 302, which may include rig state parameters, such as bit depth, measured depth, flowrate, hookload, identification of active ("lined up) trip tank(s) (e.g., those tanks that are sending/receiving fluid from the wellbore), block position, drilling activity, etc. Further, the method 300 may detect the beginning and end of a stand of pipe(s), as at 304, e.g., the time between two connection events (e.g., when tripping in, the time between connecting two successive pipe stands, and when tripping out, the time between disconnecting two successive pipe stands). The measurements taken during this time may be representative of the state of the rig and/or events that occur, while an associated stand is being run. Such data may be referenced to particular stands.

The method 300 may also include detecting trip tank transfer events, as at 306. For example, one trip tank may serve as a primary tank, receiving and providing fluid for introduction into the wellbore, while another may serve as a backup reservoir. To avoid a transfer event being interpreted by a control system as an undesired influx of fluid from the well, transfer events may be inputted, detected, or otherwise accounted for in the method 300.

The foregoing inputs may be received/calculated on an on-going basis, e.g., continuously (e.g., at a sampling rate). The following worksteps may be initiated by a connection event, e.g., indicating the completion of removal or addition of a given stand in the pipe string, and associated with individual stands.

The method 300 may include computing pipe length/pipe speed, as at 310. The method 300 may also include computing flow condition, as at 312. Such flow condition may include fluid flow rates to/from the wellbore and/or the lined-up tank(s). The method 300 may include computing volume change for the tripping tanks, as at 314. Volume change may be calculated based on the fluid that is added or removed from the tripping tanks (accounting for transfer events, as noted above).

The method 300 may include detecting transfer tanks that are lined-up for use, as at 316. That is, the method 300 may determine which tanks are active, in order to accurately determine fluid volume changes. This determination may be based at least partially on the volume changes computed at 314. For example, minimum volume changes established from standard pipe specifications may be assumed, e.g., the method 300 may assume that the volume changes by at least a minimum amount if it is being used as a reservoir for the tripping operations for the current stand. Any tanks with a volume that did not change by at least the minimum may be considered not lined up, while those that did change in volume by at least the minimum may be considered lined up.

Further, the method 300 may detect transfer events, as at 318. This may permit tracking fluid changes due to transfers between tanks, rather than caused by changes in pipe volume in the wellbore. Transfers into/out of a tank may be employed to exclude tanks that would appear lined up based solely on volume change but were actually employed in a transfer. Transfers may be accommodated, or as will be noted below, may cause the method 300 to exclude the current stand from the analysis and recommence for a subsequent stand after transfer is complete.

The method 300 may then compute an overall "context" for the stand, as at 320. This may indicate whether the fluid data for the stand is "valid" for analysis, e.g., based on the conditions calculated in 310-318. The method 300 may then determine whether the tripping activity is active and appropriate to include in the output analysis, as at 322, based on the context and any of the other computations or inputs.

For example, the method 300 may confirm that the current activity is a tripping, e.g., without drilling occurring. Further, the method 300 may determine that the wellbore is connected to a trip tank, and transfers of fluid did not occur during the running of the current stand (or if such a transfer occurred, it is accounted for in the fluid volume change determination). Other events may trigger a "no" determination at 322. For example, a short depth between the bottomhole assembly (e.g., at/near the distal end of the pipe string) and the bottom of the wellbore may make sensor measurements (e.g., hookload) unreliable. Similarly, measurements of pipe strings that terminate in shallow regions (e.g., pipe string nearly removed from the well) may also be unreliable. Further, if the pipe length is above a certain limit, it may cause the method 300 to exclude the pipe stand from the analysis.

If the determination at 322 is negative, the method 300 may exit the process, as at 323, as other monitoring/processing systems and methods may be used to monitor the drilling rig operations. Otherwise, the method 300 may proceed to determining whether there is an anomalous fluid condition, e.g., an influx or loss of fluid.

In an embodiment, the method 300 may proceed by computing a median displacement for a buffer of recent stands, as at 324. For example, a number of the most recent stands that were tripped in or tripped out, and the volumetric data associated therewith may be employed. For example, a median, mode, average, or some other statistical measure of the buffer of stands may represent what may be expected from tripping a subsequent stand of similar/same specifications into/out of the wellbore.

The method 300 may then compute one or more alarms for the stand, as at 326. An alarm may indicate an unexpected change in the fluid volume in the fluid circuit 200. As noted above, as the pipe stands are run into/out of the wellbore, the fluid volume changes. However, if the fluid changes by an amount that is close to the expected, as determined at 324, this may be indicative of normal operation. If the fluid volume changes by an amount that is not close to the expected, it may be an indication of a fluid event in the wellbore. Accordingly, the method 300 may compare the fluid volume change associated with the current stand with what is expected based on the buffer, as noted above. The difference between expected and measured may be referred to as the "delta displacement change". If the magnitude (it could be positive or negative depending on whether fluid is lost or gained) of the delta displacement change is above a certain threshold (e.g., 50%), an alarm may be triggered.

A single alarm may be a false positive, e.g., caused by some other factor influencing the measured fluid volume in the wellbore or elsewhere in the fluid circuit. Accordingly, a single alarm may be logged, but not acted upon in some embodiments. If the next stand also triggers an alarm, this may be indicative of a fluid event, and thus a "high" alarm may be triggered, and operators may be alerted, wellbore fluid parameters changed (e.g., automatically) or other physical responses taken. In response to an alarm, particularly in the context of an influx of fluid due to a kick, the well may be shut in. Other mitigation responses may also or instead be conducted.

Figure 4:
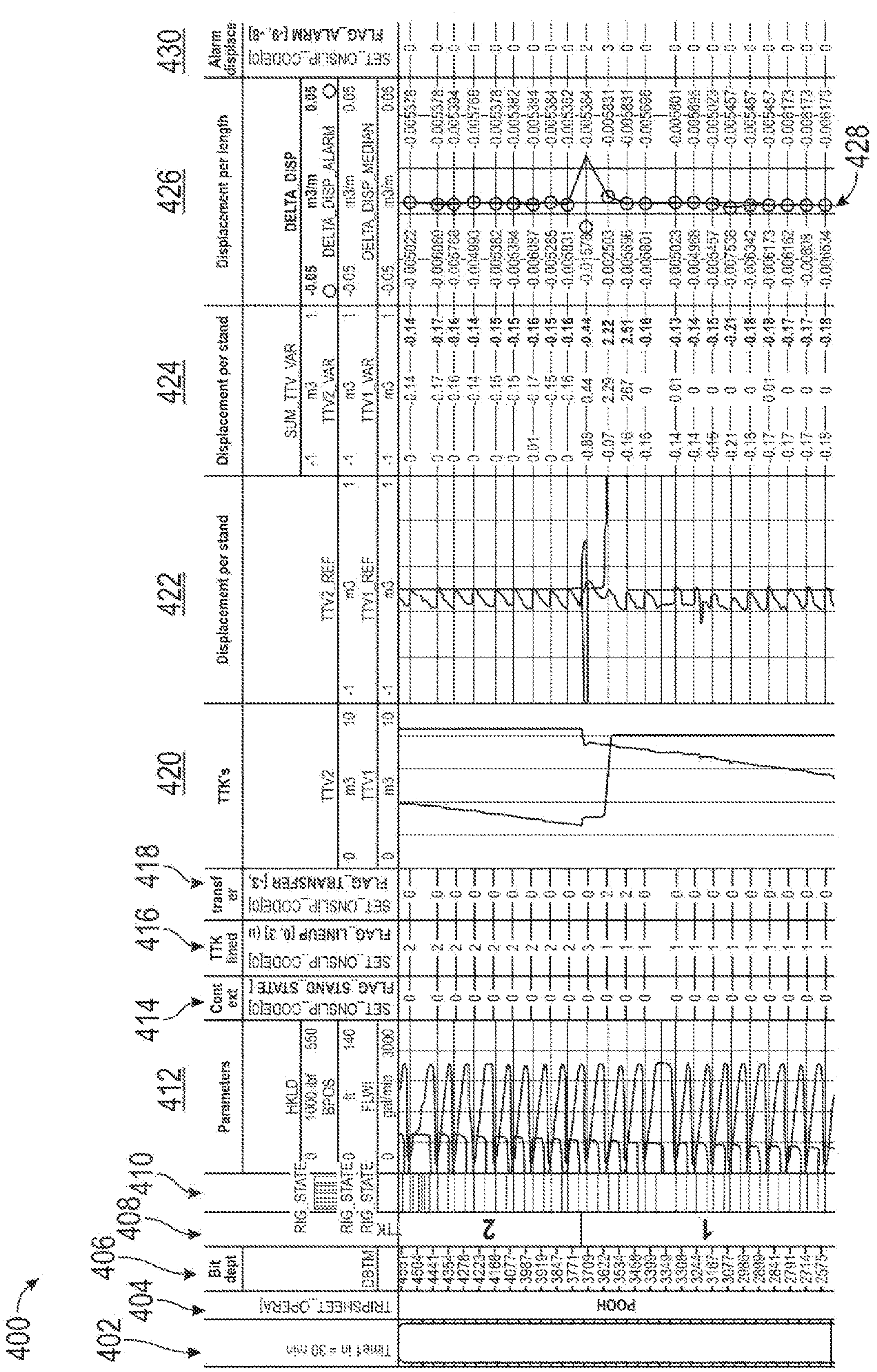
FIG. 4 illustrates a tripping log that may be generated using the method of FIG. 2, according to an embodiment.

The method 300 may also generate a dashboard visualization of tripping operations, as at 328. FIG. 4 illustrates an example of such a dashboard 400, according to an embodiment. The dashboard 400 may be fashioned as a log, which may be familiar to operators. The dashboard 400 may thus include columns, which may be generally scaled/referenced to bit depth. In the specific, illustrated example, the dashboard 400 provides column 402 for time, 404 for operation type (e.g., pulled out of hole—POOH, or run in hole), column 406 for bit depth, column 408 identifying which transfer tank is active, column 410 may display an indicator representing rig state, and column 412 representing rig equipment parameters such as hookload, drill string position, and/or fluid conditions.

The dashboard 400 may also provide columns for inferences in the form of "flags". For example, column 414 may indicate a flag for the stand state. The stand state flag may be representative of whether the stand that is being run is "valid", meaning it can be included in the analysis of fluid conditions, as noted above. For example, no transfers occurred, depth below BHA, based on connection depth, is sufficient, depth above bottom is sufficient, etc. For example, a flag value of 0 indicates bit depth, drilling margin, pump, stand length are acceptable; 1 means bit depth too low; 2 means drilling margin too low; 3 means bit depth and drilling margin are too low; 4 means pumping on; 5 means stand length is too small, and −1 means error/unknown.

Column 416 displays a value for a flag that represents the lined-up transfer tank. For example, in this embodiment, a flag value of 0 means no TTV detected; a flag value of 1 means tank 1 is lined up; a flag value of 2 means tank 2 is lined up; and a flag value of 3 means both tank 1 and tank 2 are lined up. Column 418 displays a flag value for whether a transfer occurs and what type of transfer occurs. In this example, a flag value in column 418 of −3 means both tanks are emptying; a flag value of −2 means a second one of the tanks is emptying; a flag value of −1 means a first one of the tanks is emptying; a flag value of 0 means no transfer; a flag value of 1 means the first tank is filling; a flag value of 2 means the second tank is filling; a flag value of 3 means both tanks are filling; and a flag value of 4 means unknown/error.

Column 420 displays fluid volume within the individual transfer tanks as a function of time. Column 422 represents displacement measured per stand. As can be seen, the displacement experiences a large change where column 408 indicates a change between tanks 1 and 2. Column 424 represents displacement for each stand numerically, based on the variation in the individual tanks. Column 426 illustrates displacement per length during the running of each stand, with sub column 428 specifically illustrating the delta displacement change. Column 430 indicates an alarm flag, with 0 being no alarm, 2 being medium alarm, and 3 being a high alarm.

Figure 5:
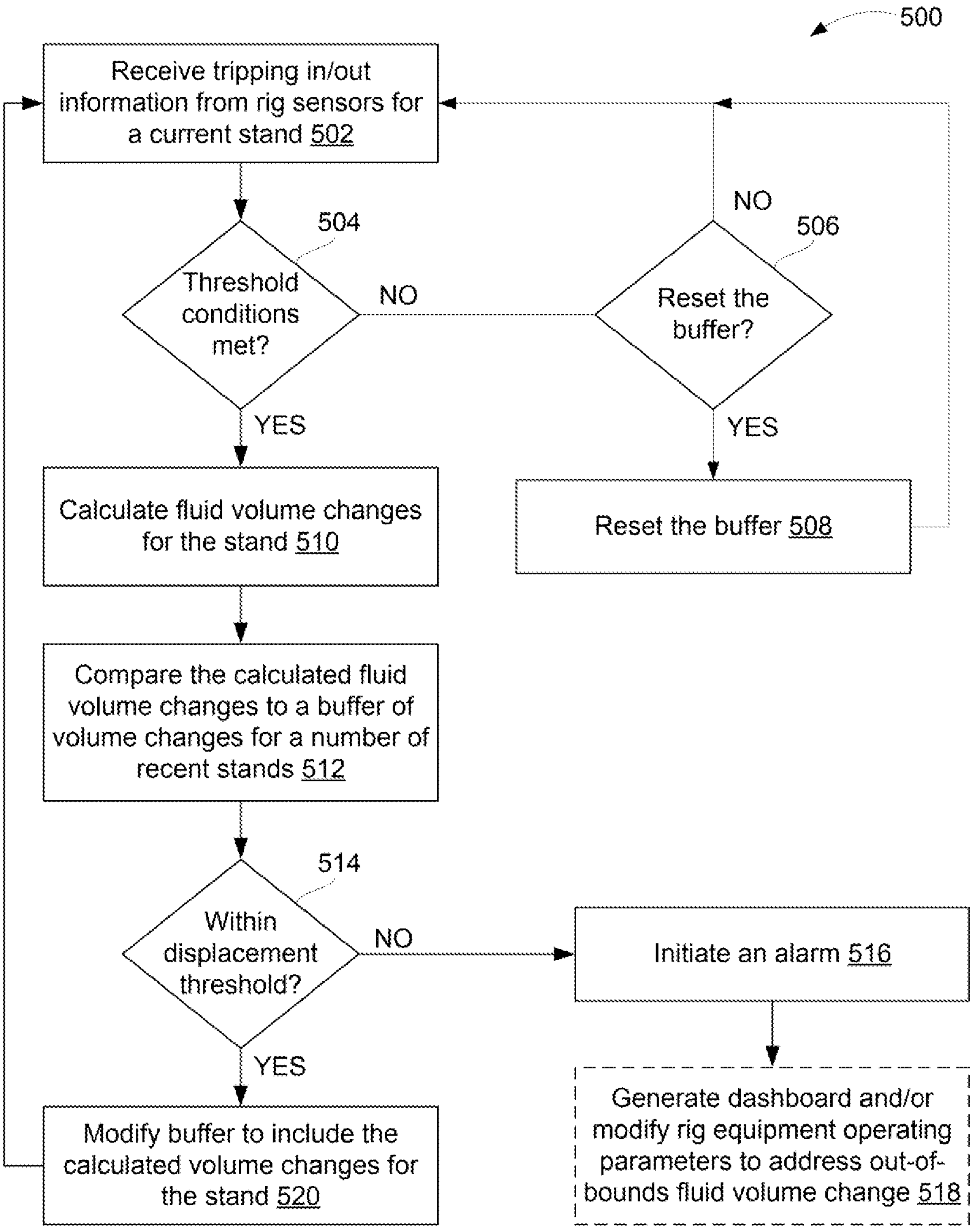
FIG. 5 illustrates a flowchart of another method for detecting and mitigating a fluid event in a wellbore during a dripping operation, according to an embodiment.

FIG. 5 illustrates a flowchart of a method 500 for detecting and mitigating a fluid event in a wellbore during a tripping operation, according to an embodiment. The method 500 may include tripping in/out information from rig sensors for a current stand, as at 502. For example, such parameters may include connection depth, connection bottom depth, pipe length, pipe motion direction (in or out), pipe speed, pumping condition (on/off) volume change for each trip tank.

Based on the inputs, the method 500 may include determining whether threshold conditions are met. First, the method 500 may determine a volume change for each trip tank. Based in part on the volume change, the method 500 may determine which transfer tank(s) is (are) lined up (e.g., in active use in the fluid circuit). If no transfer tanks are lined up, the threshold condition may not be met.

The threshold conditions may include whether the input data was acquired during a tripping condition, e.g., based on the pumping condition. The tripping condition may be determined based on a no drilling condition and a no pumping condition. Further, the threshold conditions may include no transfer in/out within the trip tank lined up, e.g., based on trip tank transfer, or that there is no trip tank found lined up. Other threshold conditions may include depth below BHA length, based on connection depth, depth above a certain margin from bottom, e.g., based on connection depth and connection bottom depth, and/or pipe length above a limit based on pipe length.

If the threshold conditions are not met (504: "NO"), the method 500 may proceed to determining whether to reset the buffer, as at 506. As will be described in greater detail below, the buffer represents fluid displacement information associated with a certain number of stands that were either run into the well or pulled out of the well prior to the current stand, e.g., the most recent five, 10, or more stands. The buffer is populated with fluid volume change information collected during tripping operations from "valid" stands, e.g., those that met the threshold conditions, in prior iterations of at least a portion of the method 500. The buffer may be purged (reset) when it is no longer useful, e.g., when conditions materially change, which may be determined based on rig state, tripping operation data, or both. For example, when tripping direction changes or when drilling/pumping conditions change. Thus, the method 500 may make the buffer-reset determination at 506 and proceed to reset the buffer at 508, if it is determined to do so, and then proceed back to collecting data for the next current stand, as shown.

If the threshold conditions are met at 504 (504: "YES"), the method 500 may move to calculating fluid volume changes for (e.g., that occur while operating with) the fluid circuit, representing the tripping operation for the current stand, as at 510. These calculations may be made based on the fluid volume change received for the lined-up tank(s) in the fluid circuit, considering transfers (if no transfer is not a threshold condition). Next, the method 500 may compare the calculated drill fluid volumetric changes to the aforementioned buffer of volumetric changes for a number of recent stands, as at 512. A statistical measure may be made for the data received for the stands in the buffer. For example, the average, mean, mode, or any other datapoint may be used. This may be considered the "expected" fluid volume change, given that the pipe specifications are the same within a tolerance, the operations are the same within a tolerance (e.g., the depth is similar, the wellbore is the same, etc.). Accordingly, a relatively large departure from the expected, taking into consideration a factor to compensate for uncertainty, tolerancing, incidental fluid losses/gains, etc., may represent an undesired fluid event in the wellbore.

The method 500 may thus determine whether the fluid volume change associated with the current stand is within a threshold of the expected, as at 514. Specifically, a "delta displacement" may refer to the difference between the expected and the measured displacement. The delta displacement threshold may be the allowable difference. The delta displacement may be negative or positive, depending on whether less or more fluid volume change is measured than expected, and thus the threshold may refer to an absolute value (magnitude) of the change. In some embodiments, the threshold may be different for fluid losses or increases, however. The threshold may be a static value, e.g., 50%, or may be dynamically determined, set by a user as a variable input, etc.

If the delta displacement is not within the threshold (514: "NO"), the method 500 may initiate an alarm, as at 516. As noted above, in some cases, a single alarm may be indicative of a spurious signal or some other false positive, unrelated to a fluid event in the wellbore. Accordingly, two successive alarm triggers may be the basis for taking mitigating action.

Before, during, after, or separate from initiating the alarm at 516, the method 500 may generate a dashboard and/or modify rig equipment operating parameters to address out-of-bounds drill fluid volumetric change (e.g., delta volumetric displacement greater in magnitude than the threshold), as at 518. The dashboard may be similar to the dashboard discussed above with reference to FIG. 4. The alarm may be a visible, audible, or any other sensory alarm, and may indicate potential fluid event/hazard in the well, which users may act upon to take appropriate mitigating actions. Various mitigating actions may be initiated in response to the alarm (e.g., automatically or through intervention by an operator). For example, a well may be shut-in in response to a kick, pumping parameters may be changed, fluid pressure may be changed, etc.

If the delta displacement is within the threshold (514: "YES"), the method 500 may have a new, valid, and most-recent fluid volume datapoint, which it may add to the buffer, as at 520. It is noted, though, that if the delta displacement is not within the threshold, fluid change information for the current stand may not be added to the buffer. In some embodiments, the oldest data in the buffer may be replaced with the new fluid change data for the valid stand, e.g., first in first out. In other embodiments, other statistical techniques for modifying the buffer with the new data may be employed. The method 500 may then loop back and begin acquiring data for the tripping operation for the next stand at 502.

It will be appreciated that the worksteps in the foregoing methods may be performed in the order presented, or in any other order. Further, some worksteps may be combined into a single workstep, while others may be separated into two or more worksteps. Various worksteps may be performed simultaneously and/or in parallel, and/or one or more worksteps may be added in between any two consecutive worksteps without departing from the scope of the present disclosure.

Figure 6:
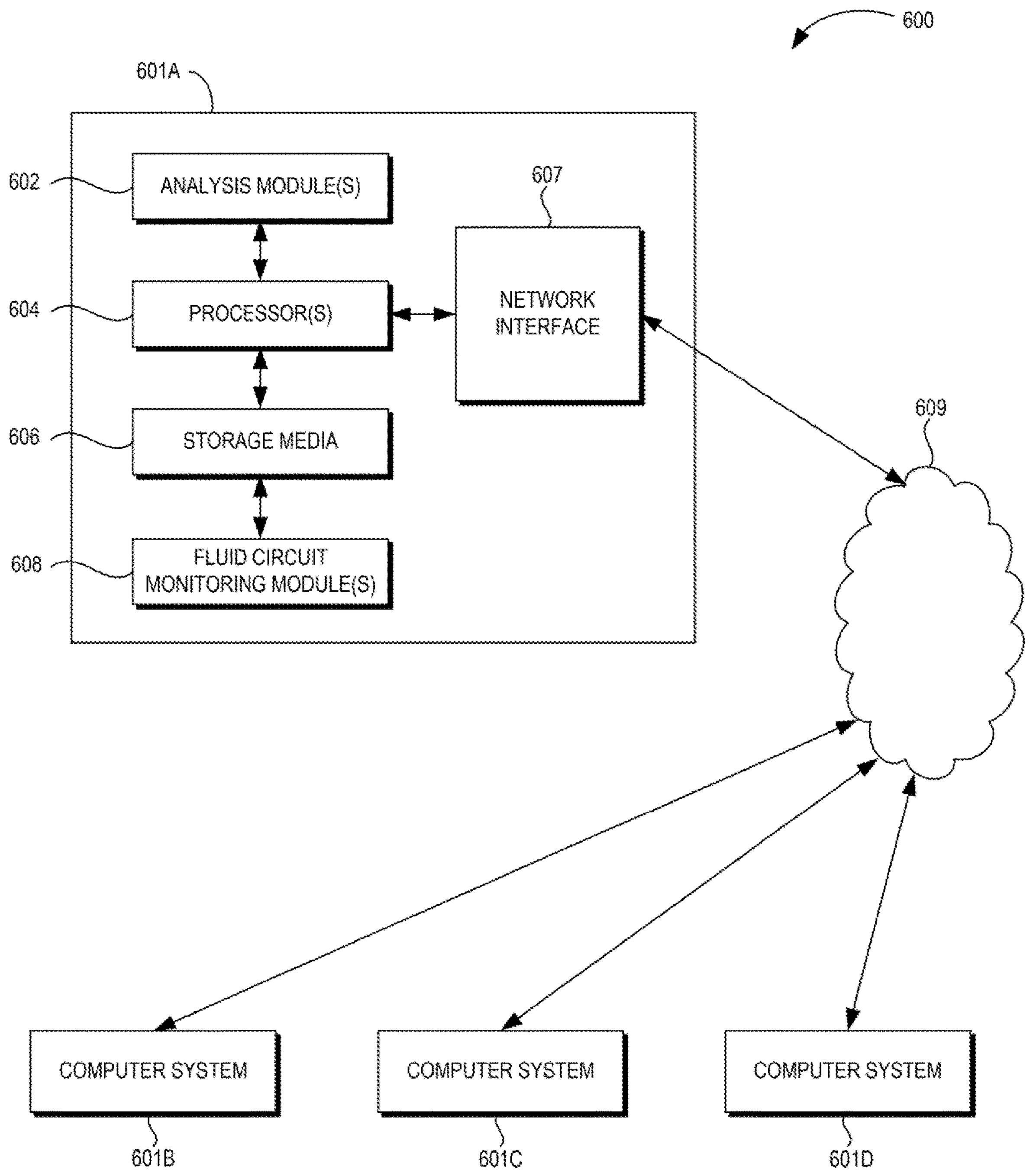
FIG. 6 illustrates a schematic view of a computing system, according to an embodiment.

In some embodiments, the methods of the present disclosure may be executed by a computing system. FIG. 6 illustrates an example of such a computing system 600, in accordance with some embodiments. The computing system 600 may include a computer or computer system 601A, which may be an individual computer system 601A or an arrangement of distributed computer systems. The computer system 601A includes one or more analysis modules 602 that are configured to perform various tasks according to some embodiments, such as one or more methods disclosed herein. To perform these various tasks, the analysis module 602 executes independently, or in coordination with, one or more processors 604, which is (or are) connected to one or more storage media 606. The processor(s) 604 is (or are) also connected to a network interface 607 to allow the computer system 601A to communicate over a data network 609 with one or more additional computer systems and/or computing systems, such as 601B, 601C, and/or 601D (note that computer systems 601B, 601C and/or 601D may or may not share the same architecture as computer system 601A, and may be located in different physical locations, e.g., computer systems 601A and 601B may be located in a processing facility, while in communication with one or more computer systems such as 601C and/or 601D that are located in one or more data centers, and/or located in varying countries on different continents).

A processor may include a microprocessor, microcontroller, processor module or subsystem, programmable integrated circuit, programmable gate array, or another control or computing device.

The storage media 606 may be implemented as one or more computer-readable or machine-readable storage media. Note that while in the example embodiment of FIG. 6 storage media 606 is depicted as within computer system 601A, in some embodiments, storage media 606 may be distributed within and/or across multiple internal and/or external enclosures of computing system 601A and/or additional computing systems. Storage media 606 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 600 contains one or more fluid circuit monitoring module(s) 608. In the example of computing system 600, computer system 601A includes the fluid circuit monitoring module 608. In some embodiments, a single fluid circuit monitoring module may be used to perform some aspects of one or more embodiments of the methods disclosed herein. In other embodiments, a plurality of fluid circuit monitoring modules may be used to perform some aspects of methods herein.

It should be appreciated that computing system 600 is merely one example of a computing system, and that computing system 600 may have more or fewer components than shown, may combine additional components not depicted in the example embodiment of FIG. 6, and/or computing system 600 may have a different configuration or arrangement of the components depicted in FIG. 6. The various components shown in FIG. 6 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 600, FIG. 6), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principles of the disclosure and its practical applications, to thereby enable others skilled in the art to best utilize the disclosed embodiments and various embodiments with various modifications as are suited to the particular use contemplated.

What is claimed is:

1. A method, comprising:

obtaining, via one or more sensors, fluid volume change data for a fluid circuit including a wellbore and one or more tripping tanks, the fluid volume change data representing the fluid circuit during a tripping operation for each of a plurality of pipe stands, wherein the fluid volume change data for the plurality of pipe stands forms a buffer;

obtaining rig state data of drilling rig equipment in a wellbore, tripping operation data, or both associated with a second pipe stand;

determining to reset the buffer based on the rig state data, the tripping operation data, or both associated with the second pipe stand;

purging the buffer until the buffer is empty;

refilling the buffer based on fluid change data associated with a tripping operation for two or more pipe stands subsequent the second pipe stand;

calculating a delta displacement threshold based at least in part on the buffer;

receiving additional fluid volume change data for the fluid circuit, the additional fluid volume change data representing the fluid circuit during a tripping operation for a first pipe stand;

comparing the fluid volume change data for the first pipe stand with the delta displacement threshold;

determining that the fluid volume change data for the first pipe stand represents a delta displacement that is greater in magnitude than the delta displacement threshold;

initiating an alarm in response to determining that the fluid volume change data for the first pipe stand represents the delta displacement that is greater in magnitude than the delta displacement threshold; and in response to the alarm indicating an influx of fluid to the wellbore, controlling the drilling rig equipment in the wellbore to adjust one or more pumping parameters.

2. The method of claim 1, wherein obtaining the fluid volume change data comprises measuring fluid in each of the one or more tripping tanks, and wherein the method further comprises determining that the one or more tripping tank are lined up based at least in part on the measurements of fluid in the one or more tripping tanks.

3. The method of claim 1, wherein determining to reset the buffer comprises determining that a tripping direction, a pumping direction, or both is changed for the second pipe stand in comparison to a tripping direction, a pumping direction, or both for the plurality of pipe stands in the buffer.

4. The method of claim 1, further comprising:

determining that one or more threshold conditions for the tripping operation associated with the second pipe stand are not met; and refraining from adding fluid change data representing the tripping operation associated with the second pipe stand to the buffer.

5. The method of claim 4, wherein the one or more threshold conditions are selected from the group consisting of:

no transfer of fluid between tripping tanks during the tripping operation;

depth below a bottom-hole assembly above a minimum;

depth above a bottom of the wellbore above a minimum; and length of the second pipe stand above a minimum.

6. The method of claim 1, further comprising:

comparing fluid volume change data for the second pipe stand with the delta displacement threshold;

initiating a second alarm in response to determining that the fluid volume change data for the second pipe stand represents the delta displacement that is greater in magnitude than the delta displacement threshold; and in response to initiating the second alarm, logging the second alarm, wherein initiating the alarm comprises initiating a high alarm in response to the alarm being triggered after initiating the second alarm, and wherein the controlling the drilling rig equipment to adjust the one or more pumping parameters is in response to the alarm being the high alarm.

7. The method of claim 1, further comprising modifying the buffer based at least in part on the fluid volume change data associated with the first pipe stand.

8. The method of claim 1, further comprising generating a dashboard that displays the alarm, the delta displacement, and one or more rig conditions to an operator, wherein the controlling the drilling rig equipment to adjust the one or more pumping parameters is in response to the operator making a control decision based at least in part on the dashboard.

9. The method of claim 1, wherein the controlling the drilling rig equipment in the wellbore to adjust the one or more pumping parameters comprises controlling the drilling rig equipment in the wellbore to adjust a fluid pressure of fluid in the wellbore.

10. A computing system, comprising:

one or more processors; and a memory system comprising one or more non-transitory computer-readable media storing instructions that, when executed by at least one of the one or more processors, cause the computing system to perform operations, the operations comprising:

obtaining, via one or more sensors, fluid volume change data for a fluid circuit including a wellbore and one or more tripping tanks, the fluid volume change data representing the fluid circuit during a tripping operation for each of a plurality of pipe stands, wherein the fluid volume change data for the plurality of pipe stands forms a buffer;

obtaining rig state data of drilling rig equipment in a wellbore, tripping operation data, or both associated with a second pipe stand;

determining to reset the buffer based on the rig state data, the tripping operation data, or both associated with the second pipe stand;

purging the buffer until the buffer is empty;

refilling the buffer based on fluid change data associated with a tripping operation for two or more pipe stands subsequent the second pipe stand;

calculating a delta displacement threshold based at least in part on the buffer;

receiving additional fluid volume change data for the fluid circuit, the additional fluid volume change data representing the fluid circuit during a tripping operation for a first pipe stand;

comparing the fluid volume change data for the first pipe stand with the delta displacement threshold;

determining that the fluid volume change data for the first pipe stand represents a delta displacement that is greater in magnitude than the delta displacement threshold;

initiating an alarm in response to determining that the fluid volume change data for the first pipe stand represents the delta displacement that is greater in magnitude than the delta displacement threshold; and in response to the alarm indicating an influx of fluid to the wellbore, controlling the drilling rig equipment in the wellbore to adjust one or more pumping parameters.

11. The computing system of claim 10, wherein obtaining the fluid volume change data comprises measuring fluid in each of the one or more tripping tanks, and wherein the operations further comprise determining that the one or more tripping tank are lined up based at least in part on the measurements of fluid in the one or more tripping tanks.

12. The computing system of claim 10, wherein the operations further comprise:

determining that one or more threshold conditions for the tripping operation associated with the second pipe stand are not met; and refraining from adding fluid change data representing the tripping operation associated with the second pipe stand to the buffer.

13. The computing system of claim 10, wherein the operations further comprise:

comparing fluid volume change data for the second pipe stand with the delta displacement threshold;

initiating a second alarm in response to determining that the fluid volume change data for the second pipe stand represents the delta displacement that is greater in magnitude than the delta displacement threshold; and in response to initiating the second alarm, logging the second alarm, wherein initiating the alarm comprises initiating a high alarm in response to the alarm being triggered after initiating the second alarm, and wherein the controlling the drilling rig equipment to adjust the one or more pumping parameters is in response to the alarm being the high alarm.

14. The computing system of claim 10, wherein the operations further comprise modifying the buffer based at least in part on the fluid volume change data associated with the first pipe stand.

15. The computing system of claim 10, wherein the operations further comprise generating a dashboard that displays the alarm, the delta displacement, and one or more rig conditions to an operator, wherein the controlling the drilling rig equipment to adjust the one or more pumping parameters is in response to the operator making a control decision based at least in part on the dashboard.

16. The computing system of claim 10, wherein the controlling the drilling rig equipment in the wellbore to adjust the one or more pumping parameters comprises controlling the drilling rig equipment in the wellbore to adjust a fluid pressure of fluid in the wellbore.

17. A non-transitory computer-readable medium storing instructions that, when executed by one or more processors of a computing system, cause the computing system to perform operations, the operations comprising:

obtaining, via one or more sensors, fluid volume change data for a fluid circuit including a wellbore and one or more tripping tanks, the fluid volume change data representing the fluid circuit during a tripping operation for each of a plurality of pipe stands, wherein the fluid volume change data for the plurality of pipe stands forms a buffer;

obtaining rig state data of drilling rig equipment in a wellbore, tripping operation data, or both associated with a second pipe stand;

determining to reset the buffer based on the rig state data, the tripping operation data, or both associated with the second pipe stand;

purging the buffer until the buffer is empty;

refilling the buffer based on fluid change data associated with a tripping operation for two or more pipe stands subsequent the second pipe stand;

calculating a delta displacement threshold based at least in part on the buffer;

receiving additional fluid volume change data for the fluid circuit, the additional fluid volume change data representing the fluid circuit during a tripping operation for a first pipe stand;

comparing the fluid volume change data for the first pipe stand with the delta displacement threshold;

determining that the fluid volume change data for the first pipe stand represents a delta displacement that is greater in magnitude than the delta displacement threshold;

initiating an alarm in response to determining that the fluid volume change data for the first pipe stand represents the delta displacement that is greater in magnitude than the delta displacement threshold; and in response to the alarm indicating an influx of fluid to the wellbore, controlling the drilling rig equipment to adjust one or more pumping parameters.

18. The non-transitory computer-readable medium of claim 17, wherein obtaining the fluid volume change data comprises measuring fluid in each of the one or more tripping tanks, and wherein the operations further comprise determining that the one or more tripping tank are lined up based at least in part on the measurements of fluid in the one or more tripping tanks.

19. The non-transitory computer-readable medium of claim 17, wherein the operations further comprise:

determining that one or more threshold conditions for the tripping operation associated with the second pipe stand are not met; and refraining from adding fluid change data representing the tripping operation associated with the second pipe stand to the buffer.

20. The non-transitory computer-readable medium of claim 17, wherein the controlling the drilling rig equipment in the wellbore to adjust the one or more pumping parameters comprises controlling the drilling rig equipment in the wellbore to adjust a fluid pressure of fluid in the wellbore.

* * * * *